United States Patent
Hamby et al.

(10) Patent No.: US 6,247,204 B1
(45) Date of Patent: Jun. 19, 2001

(54) HANDLE FOR TROWEL AND RELATED TOOLS

(76) Inventors: Mike Hamby, 1778 SE. Silkwood La., Lee's Summit, MO (US) 64063; Ronald G. Meyer, 3100 W. 118th, Leawood, KS (US) 66211

( * ) Notice: Subject to any disclaimer, the term of this patent is extended or adjusted under 35 U.S.C. 154(b) by 0 days.

(21) Appl. No.: 09/397,440

(22) Filed: Sep. 15, 1999

(51) Int. Cl.7 .................................................. E04F 21/16
(52) U.S. Cl. .............................................. 16/436; 16/431
(58) Field of Search ........................... 16/421, 431, 436; 15/234.4, 234.5

(56) References Cited

U.S. PATENT DOCUMENTS

| | | | |
|---|---|---|---|
| 1,730,820 | * 10/1929 | Holden | 16/431 |
| 2,276,725 | * 3/1942 | Huffman | 16/431 X |
| 3,206,204 | 9/1965 | Lacoste . | |
| 4,466,309 | * 8/1984 | Matey | 16/421 X |
| 4,722,637 | 2/1988 | Glessman . | |
| 4,817,231 | * 4/1989 | Ocwieja | 15/235.4 |
| 5,305,660 | 4/1994 | Hasegawa . | |
| 5,327,612 | 7/1994 | Kelsay . | |
| 5,446,941 | 9/1995 | Kelsay . | |
| 5,522,111 | 6/1996 | Kelsay et al. . | |
| 5,579,556 | 12/1996 | Chung . | |
| 5,581,845 | 12/1996 | Yang . | |
| 5,615,445 | 4/1997 | Kelsay et al. . | |
| 5,713,096 | 2/1998 | Kelsay et al. . | |
| 5,737,795 | 4/1998 | Murders . | |
| 5,781,956 | 7/1998 | Kelsay et al. . | |
| 5,791,009 | 8/1998 | McComber et al. . | |

\* cited by examiner

*Primary Examiner*—Robert J. Sandy
(74) *Attorney, Agent, or Firm*—John C. McMahon

(57) ABSTRACT

A handle for use in conjunction with a trowel or other tool having a tang for joining with the handle. The handle is constructed of a pair of shell portions that mate together to form a handle body. Each of the shell portions have radially inward extending members, such as flat annular or washer-shaped members, that have central openings. The openings align when the shell portions are mated and receive the tool tang to lock the shell portions together. A series of spaced ribs on each shell portion mates with opposed ribs and with the tang to strengthen the handle body. The exterior of the body is covered with a two-part, generally resilient and comfortable grip or cover. The cover is formed by first injection molding a part of the cover on the body. Thereafter, the body is placed in a second mold to mold the second part of the cover. Both parts of the cover extend to the surface and provide a difference in color, durometer or both.

8 Claims, 3 Drawing Sheets

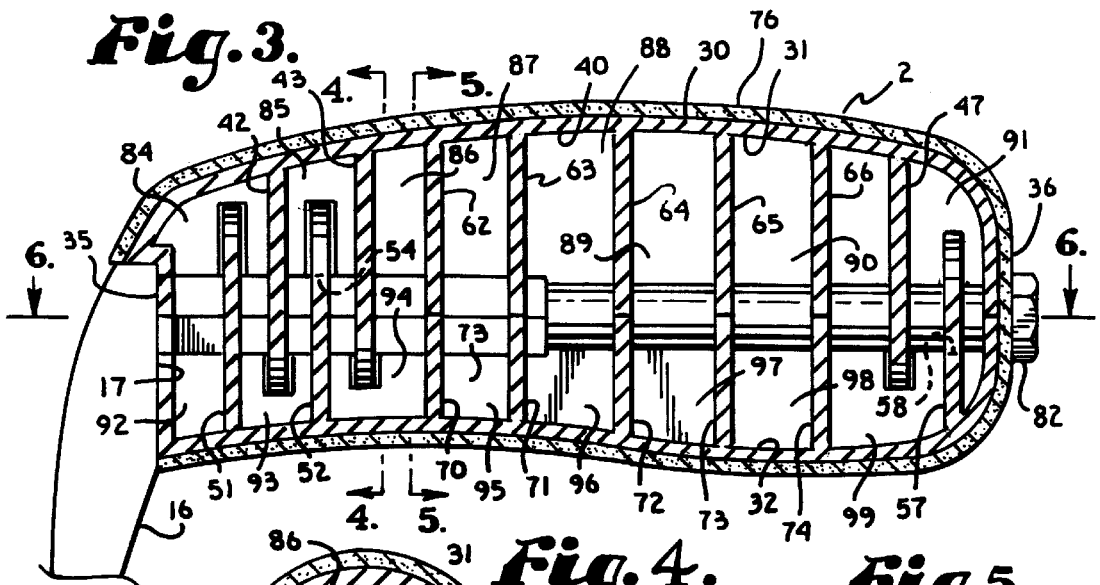
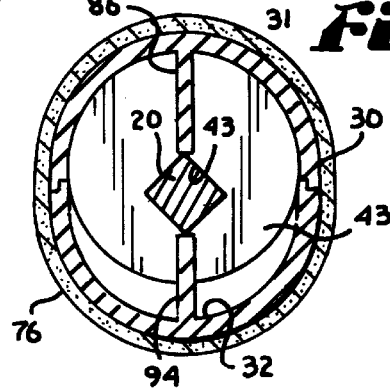
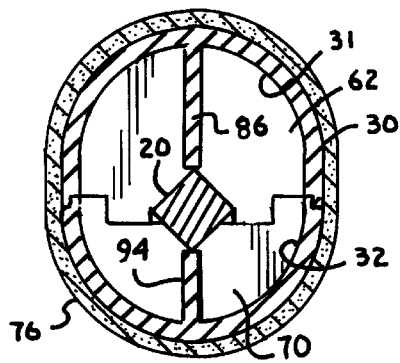
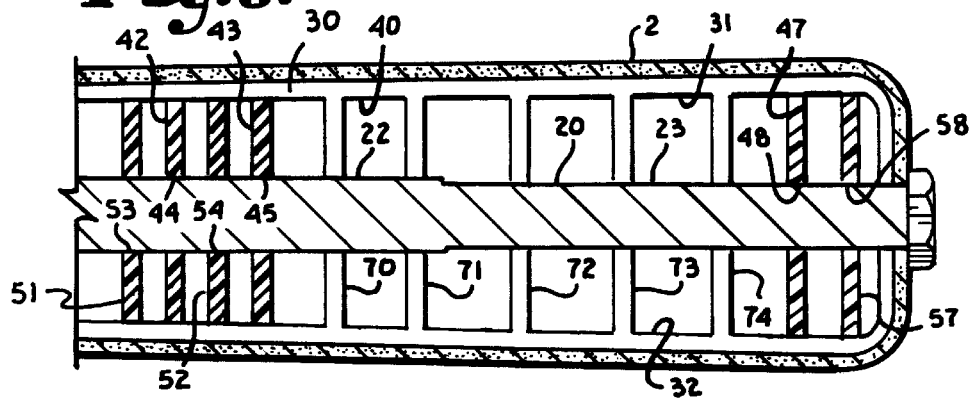

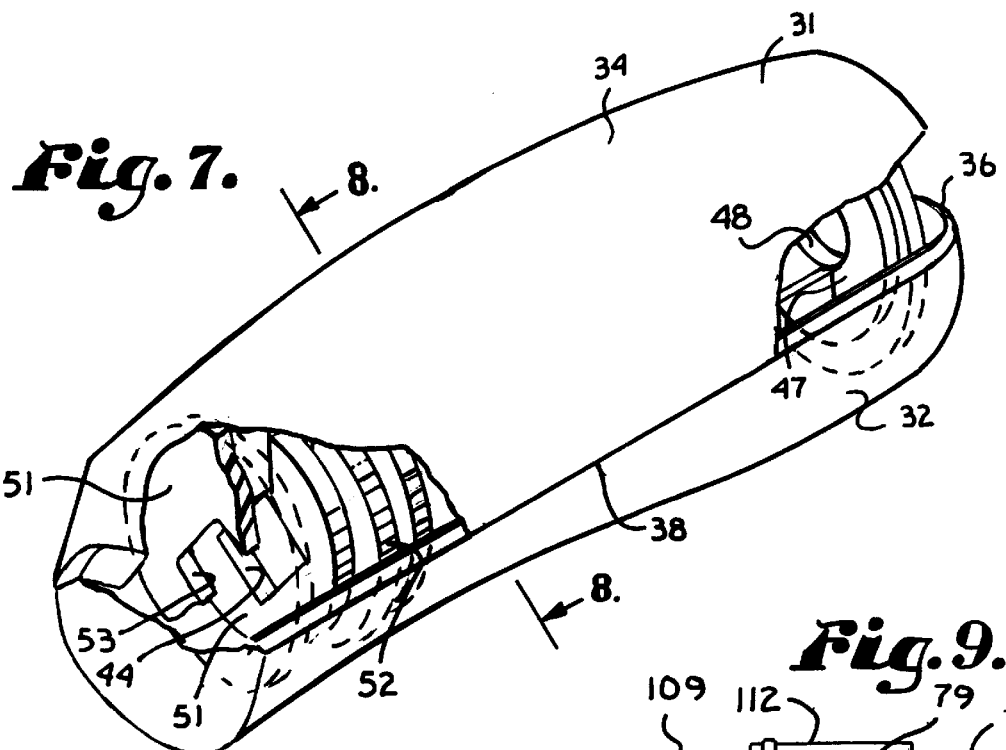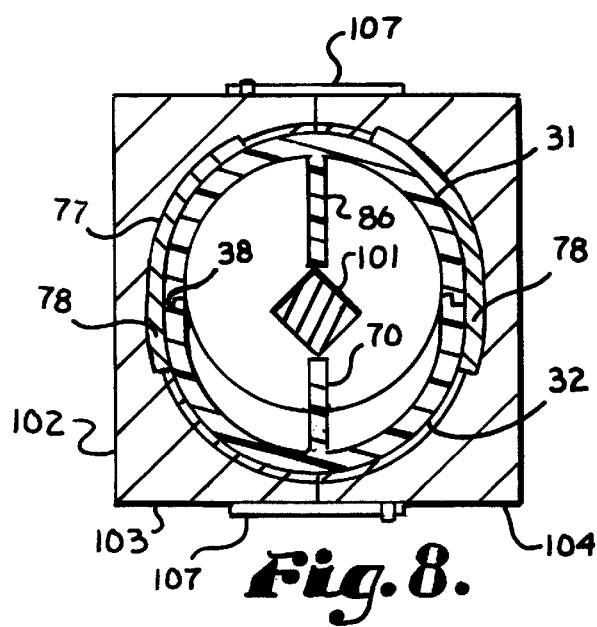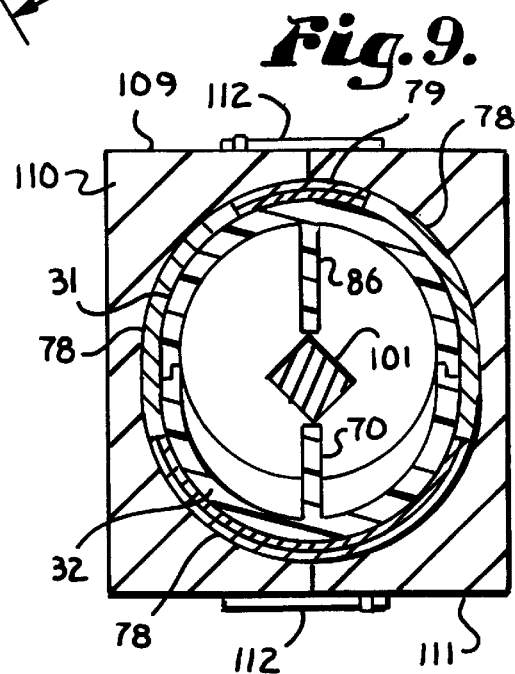

HANDLE FOR TROWEL AND RELATED TOOLS

BACKGROUND OF THE INVENTION

The present invention is directed to a handle for use in conjunction with trowels and related hand tools. The handle is designed to provide a comfortable and conforming grip that allows the user to control the tool, while also being lightweight.

Craftsmen and tradesmen use various hand tools such as trowels for finishing concrete, plaster and the like on a daily basis. It is important to these craftsmen that the tools be lightweight and very controllable by the craftsman. Likewise, it is important that the grip be conforming to the craftsman's hand and be comfortable during many hours of continuous use.

Historically, handles for tools of this type were often constructed of solid wood. The wood could be shaped and formed to fit the hand of the user, but added a substantial amount of weight to the overall device and, because the wood was not very soft or pliable, was not always comfortable after long usage.

More recently, trowel handles have been designed that have a relatively open interior chamber surrounded by an outer shell. In such constructions, there are many different points of construction that must be considered. In particular, it is important to provide a grip that is easy and comfortable to hold, that allows the craftsman to fully control the tool and that is soft and pliable so as to reduce stress and fatigue associated with use. It is also desirable to design the handle so that the interior will resist the entry of water into the interior of the handle when the tool is washed or soaked in a bucket of water.

It is further important to provide an open interior to reduce weight, but also provide support the exterior of the handle in such a way that it is not easily collapsed or compressed by the grip of the user. It is also desirable to have a construction which is comparatively easy to assemble. Finally, it is also important that the user be able to exert forces against the handle to control the tool and that those forces will be passed on to the tool without slippage or extensive wear at the location where the remainder of the tool joins the handle.

SUMMARY OF THE INVENTION

A handle is provided for use in conjunction with various hand tools, especially trowels and the like, wherein the tool has a post that extends upwardly from the tool which in turn is attached to a rearwardly extending tang. The handle is mounted bayonet style on the tang.

The handle has an upper shell and a lower shell which mate together so as to provide an exterior surface which is then covered with a soft, pliable and elastic material such as polyurethane, especially a thermoplastic elastomer, preferably in two similar but separate molded components that are molded adjacent to each other.

Each of the handle shells has attached thereto a radially inward extending, relatively flat, annular member which has a washer-shaped appearance. Preferably, two of the annular members are positioned at the front end of each shell section and one at the rear end of each shell section. As the shell sections are mated, the annular members also slide together and interleaf or overlap to form a slightly spaced but side-by-side and parallel configuration relative to one another. An opening in each of the front annular members is square shaped and an opening in each of the rear annular members is circular in shape. All of the openings in the annular members are coaxially aligned and sized and shaped to axially receive the tang with the front openings grasping a similarly shaped front portion of the tang to prevent rotation therebetween. Preferably, the openings in each of the annular members is sized so as to snuggly receive the tang as it passes therethrough. As the front openings are not circular, this allows the handle to transfer forces without relative slippage so as to control the rotation of the tang and to likewise transfer the movements of the craftsman from the handle to the tang and then to the remainder of the tool. Likewise in this manner, the tang locks and holds the two shell sections of the handle together, both at the front and the rear.

The handle also includes a series of internal ribs which extend radially inward from the exterior of each of the shell sections at spaced intervals and which are sized and shaped to mate with opposing ribs on the opposite shell section as well as mate with and be supported by the tang. In this way, the exterior of each shell section is supported against collapse by the ribs and by the annular members.

The front of the handle mates with the post supporting the tang so as to generally seal thereabout. Likewise the rear of the tang is threaded and passes exteriorly through and out of the handle to be held in place by a nut.

The outer cover is applied in a two-stage injection molding process. In particular, the handle body comprising the combined shell sections is placed in a first mold in which a first component of the outer cover is applied. Thereafter, the handle body is placed in a second mold wherein a second component of the outer cover is applied.

OBJECTS AND ADVANTAGES OF THE INVENTION

Therefore, the objects of the present invention are: to provide a handle for use in conjunction with trowels and other hand tools which is lightweight and well suited to fit and be comfortable in the hand of the user over long periods of use; to provide such a handle which includes two shell sections that are secured and held together by insertion of a tang of the tool to which the handle is mounted; to provide such a handle wherein each of the shell sections includes radially inward projecting annular members that have central openings that coaxially align when the two shell sections are placed together and that are locked in relative position to each other by insertion of the tool tang through all of the openings; to provide such a handle having a series of spaced ribs that extend between the inner surface of the shells and the tang to support the shells and prevent collapse of the handle; to provide such a handle having an exterior molded over coating of a soft and elastic material suited for providing a good grip and sealing about the sides of the handle; to provide such a handle wherein the over coating is made of two similar but slightly different materials in a two-stage molding process to offer differences in color, texture, durometer and the like; to provide such a handle which is resistant to entry of water into the interior of the handle; to provide such a handle and tool which are especially well suited for each other and wherein the handle is adapted to control the tool and withstand forces exerted by the user; and to provide such a handle and tool which are especially adapted for use in conjunction with each other, relatively inexpensive to produce and especially well suited for the intended purpose thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged and fragmentary cross-sectional view of the handle, mounted on the tang of the tool, taken along line 3—3 of FIG. 1.

FIG. 4 is an enlarged and cross-sectional view of the handle, taken along line 4—4 of FIG. 3.

FIG. 5 is an enlarged and cross-sectional view of the handle, taken along line 5—5 of FIG. 3.

FIG. 6 is a fragmentary and enlarged cross-sectional view of the handle and tang, taken along line 6—6 of FIG. 3.

FIG. 7 is an enlarged perspective view of the handle during construction showing two half shells of the handle joined and with portions broken away to show interior detail thereof.

FIG. 8 is an enlarged cross-sectional view of the handle under construction showing the combined shell positioned in a first injection mold wherein a first component of the over coating is being applied, with the cross section of the shells taken along line 8—8 of FIG. 7.

FIG. 9 is an enlarged cross-sectional view of the handle under construction showing the combined shells positioned in a second injection mold wherein a second component of the over coating is being applied, with the cross section of the shells taken along line 8—8 of FIG. 7.

DETAILED DESCRIPTION OF THE INVENTION

Figure 1:
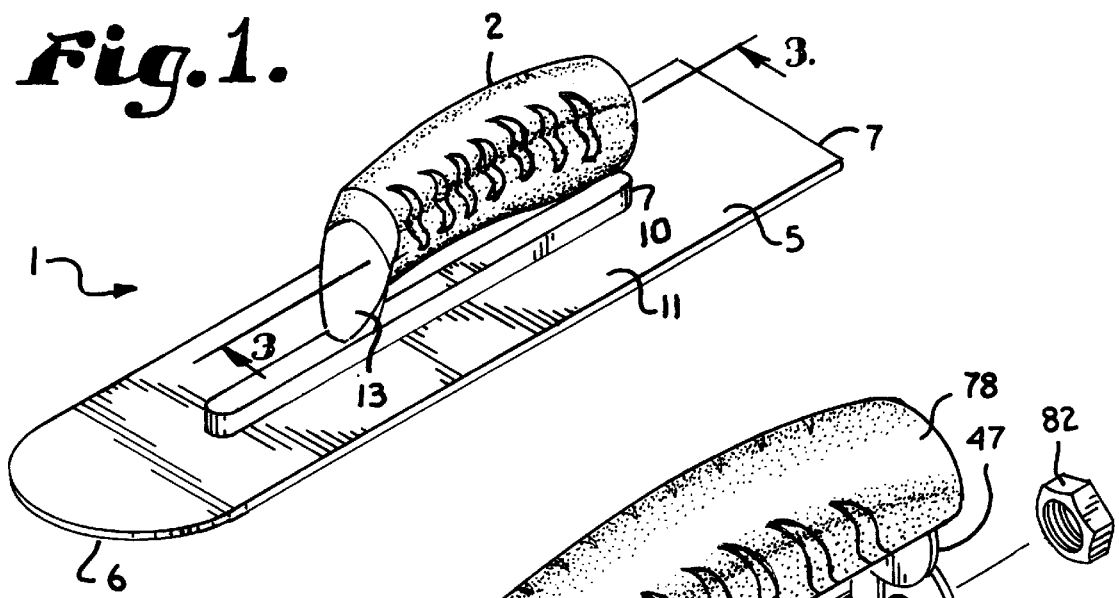
FIG. 1 is a perspective view of a tool having a handle in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a trowel having a handle 2 in accordance with the present invention.

The trowel 1 has a relatively flat metal blade 5 that is curved at the front end 6 and which has a linear rear end 7. It is foreseen that the blade of such trowel can be constructed of many different types of materials and in many shapes, including metals and plastics having various degrees of flexibility in accordance with the intended purpose of the trowel 1. A mounting bar 10 is fixedly attached to an upper side 11 of the blade 5 by welding, rivets, screws or the like. The mounting bar 10 had a generally rectangular cross-section and extends centrally and longitudinally with respect to the blade 5. The mounting bar 10 does not extend for the entire length of the blade 5, but is generally centered thereon.

A post 13 extends upwardly from the mounting bar 10 and is preferably integral therewith. The post 13 has a shield-shaped front surface 14 that widens somewhat with height and an upper or top arcuate surface 15. A rear surface 16 of the post 13 has a similar shield shape, as the front surface 14, but is somewhat flatter in a region 17 where the post 13 mates with the handle 2.

Extending rearwardly from the post and mounted integrally thereon is a tang 20. The tang 20 is relatively thin in cross-section and elongate. The tang 20 is positioned so as to be generally parallel to and extend along, but in spaced relationship with respect to the mounting bar 10. The tang 20 has a frontward portion 22 that is square or otherwise rhomboid shaped in cross-section and a rearward portion 23 which is circular in cross-section. The tang 20 is approximately evenly divided between the frontward portion 22 and the rearward portion 23. At the very rear of the tang 20 is a threaded tip 25. When the handle 2 is mounted on the tang 20, the rearward threaded tip 25 extends outwardly from the handle 2. In certain embodiments the tang may have multiple sized rectangular portions and/or circular portions.

The handle 2 includes a body 30 having a first upper body section or member 31 and a second lower body section or member 32. The upper body member 31 and lower body member 32 join together, such as shown in FIG. 7, to form a semirigid shell 34 that is enclosed except at the front end 35 and rear end 36 thereof. The shell 34 encloses an interior chamber 40. The handle 2 has a longitudinal axis A extending from front to rear thereof.

Positioned in the front of and extending radially inward from the interior side of the upper body member 31 is a pair of annular disks 42 and 43. The disks 42 and 43 are spaced along the axis A and are generally aligned perpendicular thereto. Each of the disks 42 and 43 is fixedly secured to the upper body member 31. Each of the disks 42 and 43 also have generally central openings 44 and 45, respectively, that are square shaped and have essentially the same cross-section as the tang frontward portion 22 so as to fit snuggly thereabout after assembly. The openings 44 and 45 are coaxially aligned.

The upper body member 31 also has a rearwardly positioned annular disk 47 with a circular opening 48 therethrough which is axially aligned with the openings 44 and 45.

The lower body member 32 likewise has a pair of frontwardly positioned annular disks 51 and 52 each having a central opening 53 and 54, respectively. The openings 53 and 54 are also square shaped in cross-section and are designed to snuggly receive the tang frontward portion 22. The lower body member 32 also has a rearwardly positioned annular disk 57 with a circular central opening 58 that is positioned to be axially aligned with the openings 53 and 54. When the upper body member 31 and lower body member 32 are joined together such is as shown in FIGS. 3 and 7, the openings 44, 45, 48, 53, 54, and 58 are all aligned in such a manner that the tang 20 can pass therethrough and be snuggly received therein and further that the upper body member 31 and lower body member 32 are joined together to form the completed body 30, as seen in FIG. 3. When in such alignment, the upper body member 31 and lower body member 32 are also joined at an overlapping joint 38, such as is shown in FIG. 7 to form the body 30. In this configuration, the tang 20 secures the upper body member 31 and lower body member 32 together. The square-shaped or otherwise polyhedral shaped configuration of the openings 44, 45, 53, and 54 at the front of the handle 2 is so shaped to transmit twisting forces or torsion to the tang 20 from the handle 2 without slippage.

When the annular disks 32 and 43 are positioned relative to the annular disks 51 and 52, as is shown in FIGS. 3 and 7, the various disks alternate in position, that is, the disks are located from the front in order in the sequence 51, 42, 52, and then 43. Each of the disks 42, 43, 51 and 52 are slightly spaced from adjacent disks and are aligned so that the major dimensions thereof are perpendicular relative to the tang 20 and axis A. Likewise, the rear disks 47 and 48 are slightly spaced and aligned so as to be generally perpendicular to the tang 20 and axis A. Although spaced in this embodiment, it is foreseen that the disks, such as 51 and 42, could be abutting or in contact with each other.

Positioned between the annular disk 43 and annular disk 47 are a series of spaced ribs including upper ribs 62, 63, 64, 65 and 66 and lower ribs 70, 71, 72, 73, and 74 that are attached to the lower body member 32. The ribs 62 through 66 are sized and shaped to extend inwardly from the upper body member 31, generally perpendicular to the axis A and in such a manner as to engage the lower ribs 70 through 74 which extend upwardly from the lower body member 72. The upper ribs 62 through 66 and lower ribs 70 through 74 also form an opening therebetween that receives and allows for passage of the tang 20 therethrough in such a manner as to snuggly and abuttingly engage the tang 20 and thereby support the upper body member 31 and lower body member 32 by engagement with each other and with the tang 20.

The handle body 30 is covered with an exterior coating or external cover 76 of a relatively soft, pliable plastic designed to provide comfort to the user and better grip to the user. The cover 76 is of a two-part construction. The first cover part 77 comprises a first layer with a series of upstanding inserts 78 that extend radially outward from contact with the upper body member 31 and lower body member 32 to the exterior of the cover 76. The second cover part 79, FIG. 9, is essentially the remainder or complement of the cover part 78 to complete the cover 76 over the entire shell 34 except for portions of the front end 35 and rear end 36 thereof that receive the tang 20 and post 13. The cover 76, therefore, also secures the body 30 together and provides a seal along most of the exposed portions of the body 30 to resist the entry of moisture or other materials into the cavity 40. The cover 76 extends continuously without breaks over the entire radially outer portion of the body 30 and continues also without breaks around the front end 35 and rear end 36 except where the tang 20 and post 13 are mounted.

When fully constructed, a nut 82 secures the handle 2 to the tang 20 on the threaded tip 25.

A series of cross braces 84 through 91 in the upper body member 31 and 92 through 99 in the lower body member 32 generally extend between associated ribs 62 through 66 and 70 through 74, respectively, as well as the disks 42, 43, 51, 52, 47 and 47. The cross braces 84 through 99 are axially aligned and perpendicular to both the tang 20 and the ribs 62 to 66 and 70 to 74 so as to also support the body member 31 and 32 against collapse through both engagement with and support by the tang 20 and by forming a supporting grid with the other internal elements of the handle 2.

Figure 2:
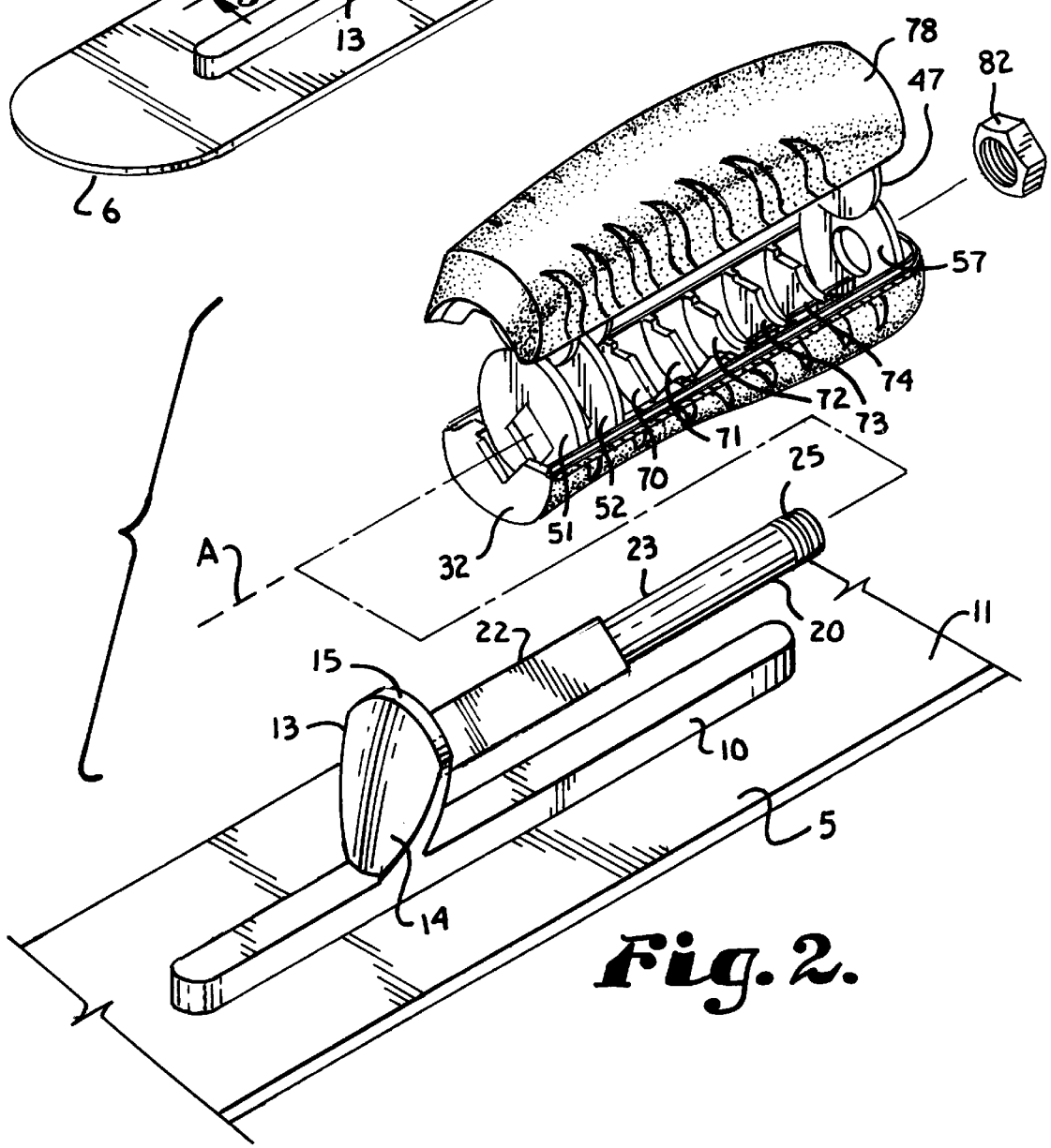
FIG. 2 is an enlarged and exploded view of the tool and handle showing internal portions of the handle and location of placement of a tang of the tool with respect to the handle.

In construction, the body 30 is assembled with the upper body member 31 and lower body member 32 joined together and held in place by a shaft or mandrel 101, that mimics the tang 20, to form the shell 34. The shell 34 is positioned in a mold 102 having two mold sections 103 and 104 held together by latches 107 and the first cover component or part 77 with inserts 78 is then molded thereon, see FIG. 8. The shell 34 is then removed from the first mold 102 and placed in a second mold 109 having mold sections 110 and 111 held together by latches 112 wherein the second cover component or part 79 is molded thereon, see FIG. 9. Thereafter, the completed handle 2 is removed from the mold 109 and the mandrel 101 is removed. The entire completed body 30 is mounted on the tang 20, as is shown in FIG. 2. The body 30 has been exploded into the upper body member 31 and a lower body member 32 in FIG. 2 to better show the internal structure; however this will normally not be the case once the cover 76 is in place. In particular, it is exploded in this situation to show the interior detail and positioning of the tang relative to the interior of the handle 2. The composition of the cover components 77 and 79 is preferably a soft polyurethane or the like with different durometers, as opposed to a harder, stiffer polypropylene or the like construction for the shell 34. A preferred material of construction is a thermoplastic elastomer sold under the trademark Santopreme by Advanced Elastomer Systems. Preferably, the material of construction used in cover components 77 and 79 is somewhat different in each case so as to provide a difference in texture, color, or the like so as to allow formation of both a pattern and a different feel when gripped.

It is to be understood that while certain forms of the present invention have been illustrated and described herein, it is not to be limited to the specific forms or arrangement of parts described and shown.

What is claimed and desired to be secured by Letters Patent is as follows:

1. A handle for a tool, said handle comprising:
   a) a first shell portion;
   b) a second shell portion; said first shell portion mating with said second shell portion to form a body of said handle adapted to receive a tang of the tool; said shell body being constructed of a stiff, semi-rigid material;
   c) a first partial overcoat located on first regions of an exterior surface of said shell body;
   d) a second partial overcoat located on second regions of said shell body exterior surface and side by side mating with said first partial overcoat; and wherein:
   e) said first and second overcoat are of dissimilar material with respect to a human sensed physical property; said first and second overcoats both being constructed of a soft, pliable material.

2. The handle according to claim 1 in combination with a trowel having a tang; said tang being inserted through said first and second members.

3. The handle according to claim 1 wherein:
   a) said first and second members are located near a front of said handle; and, including
   b) third and fourth members secured to said first and second shell portions, respectively, and extending radially inward therefrom and further being located near a rear of said handle.

4. The handle according to claim 1 including:
   a) a plurality of spared ribs joined to each of said shell portions.

5. The handle according to claim 4 including:
   a) an axially aligned cross brace positioned between each adjacent pair of ribs and adapted to abut against the tang.

6. The handle according to claim 1 including:
   a) an over cover surrounding said first and second shell portions.

7. The handle according to claim 6 wherein:
a) said shell portions are constructed of a stiff, semi-rigid material; and
b) said over cover is constructed of a soft, pliable material.

8. A handle for a tool comprising:
a) a first shell portion;
b) a second shell portion; said first shell portion mating with said second shell portion to form a body of said handle adapted to receive a tang of the tool;
c) said first shell portion having secured thereto a first member extending radially inward relative to said body;
d) said second shell portion having secured thereto a second member extending radially inward relative to said body;
e) each of said shell portions includes at least one rib extending inwardly therefrom perpendicular to a central axis thereof with each rib abutting a corresponding rib on an opposite shell portion and when abutting the corresponding rib also being adapted to abut the tang; and
f) each of said first and second members having an opening therethrough with each of said openings being coaxially aligned when said first and second shell portions are joined to form said body; said openings also being sized and shaped to snugly receive the tang of the tool and thereby secure said first shell portion and said second shell portion together.

* * * * *